(12) United States Patent
Chou et al.

(10) Patent No.: US 11,075,826 B2
(45) Date of Patent: Jul. 27, 2021

(54) TECHNIQUES FOR MONITORING VIRTUALIZED NETWORK FUNCTIONS OR NETWORK FUNCTIONS VIRTUALIZATION INFRASTRUCTURE

(71) Applicant: Apple Inc., Cupertino, CA (US)

(72) Inventors: Joey Chou, Scottdale, AZ (US); Muthaiah Venkatachalam, Beaverton, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/840,738

(22) Filed: Apr. 6, 2020

(65) Prior Publication Data
US 2020/0403891 A1  Dec. 24, 2020

Related U.S. Application Data

(63) Continuation of application No. 15/887,915, filed on Feb. 2, 2018, now Pat. No. 10,616,082, which is a
(Continued)

(51) Int. Cl.
| | | |
|---|---|---|
| *G06F 15/173* | (2006.01) | |
| *H04L 12/26* | (2006.01) | |
| *H04L 12/24* | (2006.01) | |

(52) U.S. Cl.
CPC .......... *H04L 43/08* (2013.01); *H04L 41/0896* (2013.01); *H04L 41/142* (2013.01); *H04L 43/16* (2013.01)

(58) Field of Classification Search
CPC ... H04L 43/08; H04L 41/0896; H04L 41/142; H04L 43/16
(Continued)

(56) References Cited

U.S. PATENT DOCUMENTS

| | | | |
|---|---|---|---|
| 9,912,558 B2 | 3/2018 | Chou | |
| 10,616,082 B2 * | 4/2020 | Chou | ...................... H04L 43/08 |

(Continued)

FOREIGN PATENT DOCUMENTS

| | | |
|---|---|---|
| CN | 102972080 A | 5/2011 |
| CN | 103124229 A | 11/2012 |

(Continued)

OTHER PUBLICATIONS

International Search Report and Written Opinion dated Apr. 15, 2016 in connection with PCT Application No. PCT/US2015/064689.

(Continued)

*Primary Examiner* — Wing F Chan
*Assistant Examiner* — Joseph R Maniwang
(74) *Attorney, Agent, or Firm* — Eschweiler & Potashnik, LLC

(57) ABSTRACT

Examples may include techniques for monitoring virtual network functions or network functions virtualization infrastructure. Examples include receiving performance measurement data from virtualized network functions arranged to support a network service or from network functions virtualization infrastructure composed to support the virtualized network functions. In some examples, corrective actions such as virtualized network function lifecycle management operations are initiated based on the received performance measurement data.

20 Claims, 11 Drawing Sheets

System 100

Related U.S. Application Data continuation of application No. 14/751,499, filed on Jun. 26, 2015, now Pat. No. 9,912,558.

(60) Provisional application No. 62/134,941, filed on Mar. 18, 2015, provisional application No. 62/102,991, filed on Jan. 13, 2015.

(58) Field of Classification Search
USPC .......................................................... 709/224
See application file for complete search history.

(56) References Cited

U.S. PATENT DOCUMENTS

| | | |
|---|---|---|
| 2010/0220622 A1 | 9/2010 | Wei |
| 2014/0101487 A1 | 4/2014 | Kakadia |
| 2014/0181267 A1 | 6/2014 | Wadkins |
| 2014/0201374 A1 | 7/2014 | Ashwood-Smith |
| 2014/0317261 A1 | 10/2014 | Shatzkamer |
| 2014/0362790 A1 | 12/2014 | McCann |
| 2016/0335111 A1 | 11/2016 | Bruun |

FOREIGN PATENT DOCUMENTS

| | | |
|---|---|---|
| CN | 104170323 A | 4/2014 |
| CN | 104270428 A | 1/2015 |

OTHER PUBLICATIONS

Non-Final Office Action dated Jun. 24, 2019 in connection with U.S. Appl. No. 15/887,915.

Notice of Allowance dated Aug. 28, 2019 in connection with U.S. Appl. No. 15/887,915.

"Network Functions Virtualisation (NFV); Management and Orchestration." Group Spefication. ETSI GS NFV-MAN 001 V1.1.1. (Dec. 2014).

* cited by examiner

Storage Medium 600

Computer Executable Instructions for 500

```
┌─────────────────────────────────────────────────────────────┐
│  RECEIVE PM DATA GENERATED BY AN NFVI WHILE THE NFVI SUPPORTS │
│                    ONE OR MORE VNFs                          │
│                          802                                 │
└─────────────────────────────────────────────────────────────┘
                              │
┌─────────────────────────────────────────────────────────────┐
│  FORWARD THE PM DATA TO AN NFVO IF THE PM DATA IS RELATED TO A│
│      NETWORK SERVICE PROVIDED BY THE ONE OR MORE VNFs         │
│                          804                                 │
└─────────────────────────────────────────────────────────────┘
                              │
┌─────────────────────────────────────────────────────────────┐
│ FORWARD THE PM DATA TO A VNFM ARRANGED TO MANAGE THE ONE OR  │
│   MORE VNFs IF THE PM DATA IS RELATED TO ONE OR MORE VIRTUAL │
│  RESOURCES COMPOSED FROM THE NFVI AND CONSUMED WHILE THE VR  │
│              SUPPORTS THE ONE OR MORE VNFs                   │
│                          806                                 │
└─────────────────────────────────────────────────────────────┘
```

*FIG. 8*

Storage Medium 900

*Computer Executable Instructions for 800*

FIG. 9

TECHNIQUES FOR MONITORING VIRTUALIZED NETWORK FUNCTIONS OR NETWORK FUNCTIONS VIRTUALIZATION INFRASTRUCTURE

RELATED CASE

This application is a continuation of U.S. patent application Ser. No. 15/887,915 filed on Feb. 2, 2018 which is a continuation of U.S. patent application Ser. No. 14/751,499 filed on Jun. 26, 2015, which claims priority to and the benefit of U.S. Provisional Patent Application No. 62/134,941 filed on Mar. 18, 2015, and U.S. Provisional Patent Application No. 62/102,991 filed on Jan. 13, 2015 both are hereby incorporated by reference in their entirety.

TECHNICAL FIELD

Examples described herein are generally related to wireless communication networks.

BACKGROUND

Traditionally, equipment for wireless communications networks may be deployed as physical equipment having software and hardware bound together. However, virtualization technologies have evolved to support network function software that may be executed by commercial off-the-shelf (COTS) hardware. Use of virtualization technologies may allow for a more flexible, quickly deployable or cost effective wireless communication network to be built and maintained. But these virtualized networks may be based on disaggregated physical elements (e.g., processors, memory, storage) composed to form virtualized resources (VRs) that support one or more types of virtualized network functions (VNFs). The VNFs may also be arranged to provide network services. These disaggregated physical elements composed to form VRs may be widely disbursed across various entities or locations that host the physical equipment provisioned to compose the VRs. A management architecture and various management functions may be used to control and/or manage the one or more VNFs as well as the VRs allocated to support them. In some cases, the management architecture may be built on traditional management architectures and management functions that were used for control or management of non-virtualized wireless communication networks.

BRIEF DESCRIPTION OF THE DRAWINGS

FIG. 6 illustrates an example of a first storage medium.
FIG. 8 illustrates an example of a second logic flow.
FIG. 9 illustrates an example of a second storage medium.

DETAILED DESCRIPTION

Figure 1:
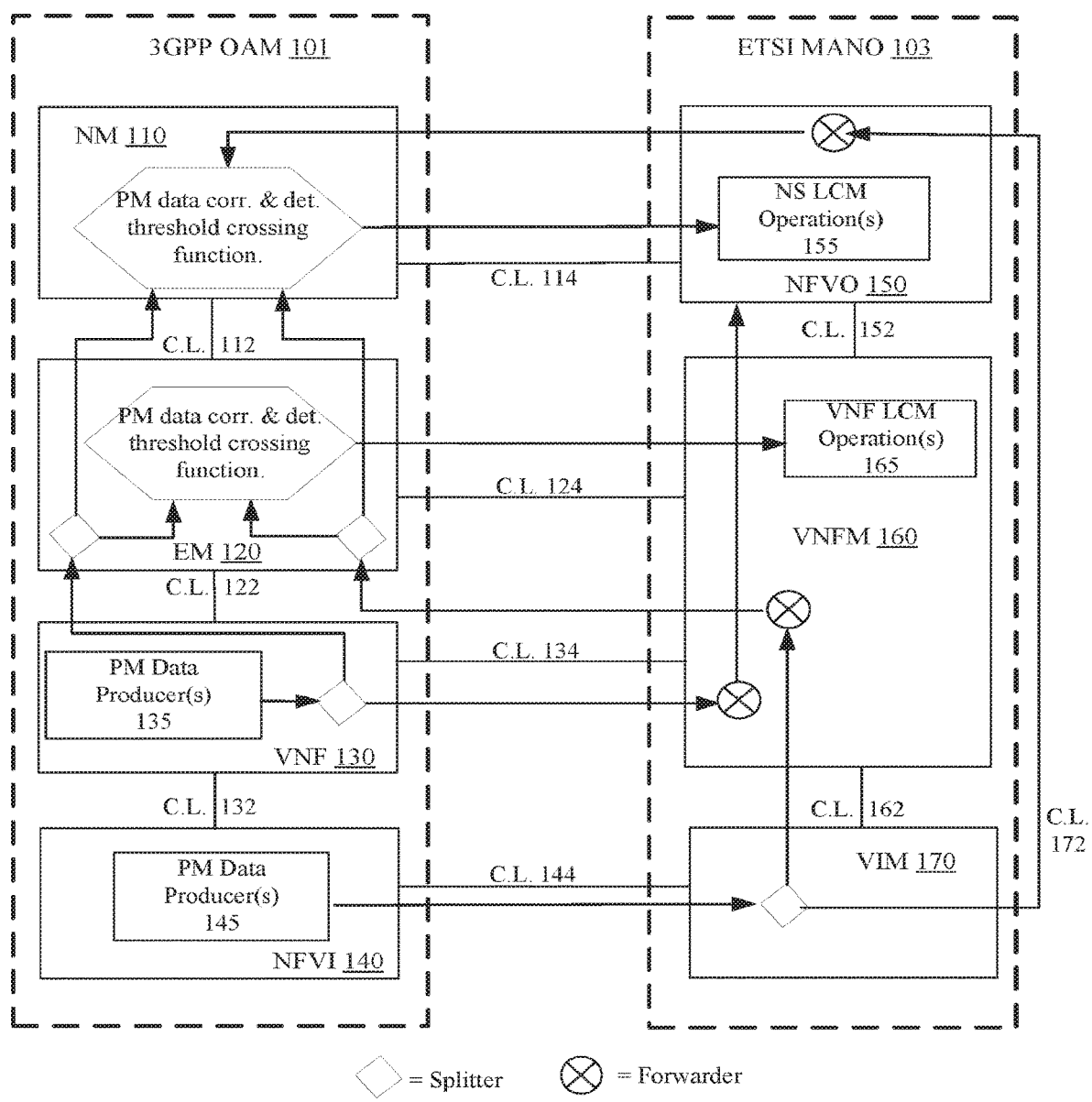
FIG. 1 illustrates an example of a first system.

Examples are generally directed to improvement for monitoring virtualized network functions (VNFs) or network functions virtualization infrastructure (NFVI). Wireless mobile broadband technologies may include any wireless technologies suitable for use with wireless devices or user equipment (UE), such as one or more third generation (3G), fourth generation (4G) or emerging fifth generation (5G) wireless standards, revisions, progeny and variants. Examples of wireless mobile broadband technologies may include without limitation any of the Institute of Electrical and Electronics Engineers (IEEE) 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8, 9, 10 or 11 of LTE/System Architecture Evolution (SAE), and so forth. The examples are not limited in this context.

By way of example and not limitation, various examples may be described with specific reference to various 3GPP radio access network (RAN) standards, such as the 3GPP Universal Terrestrial Radio Access Network (UTRAN), the 3GPP Evolved Universal Terrestrial Radio Access Network (E-UTRAN) and 3GPP's suite of UMTS and LTE/LTE-Advanced Technical Specifications (in case of LTE/LTE-Advanced collectively "3GPP LTE Specifications" according to the 36 Series of Technical Specifications), and IEEE 802.16 standards, such as the IEEE 802.16-2009 standard and current third revision to IEEE 802.16 referred to as "802.16Rev3" consolidating standards 802.16-2009, 802.16h-2010 and 802.16m-2011, and the IEEE 802.16p draft standards including IEEE P802.16.1b/D2 Jan. 2012 titled "Draft Amendment to IEEE Standard for Wireless-MAN-Advanced Air Interface for Broadband Wireless Access Systems, Enhancements to Support Machine-to-Machine Applications" (collectively "IEEE 802.16 Standards"), and any drafts, revisions or variants of the 3GPP LTE Specifications and the IEEE 802.16 Standards. Although some embodiments may be described as a 3GPP LTE Specifications or IEEE 802.16 Standards system by way of example and not limitation, it may be appreciated that other types of communications system may be implemented as various other types of mobile broadband communications systems and standards. The examples are not limited in this context.

As contemplated in the present disclosure, a management architecture and/or various management functions may be used to control and/or manage one or more VNFs as well as the VRs allocated to support them. Also, as contemplated in the present disclosure, some management architectures may be built on traditional management architectures and management functions that were used to control or manage non-virtualized wireless communication networks. However, due to the possibly diverse locations of the physical elements provisioned or composed to execute or support VRs, one entity in some virtualized environments may manage or control an VNF and yet the physical elements (e.g., processors, storage, memory, etc.) composed to form VRs arranged to support the VNF may be managed or controlled by one or more other entities.

In some examples, for a virtualized environment where 3GPP operation and management (OAM) entities are arranged to work with ETSI management and orchestration (MANO) entities for network functions virtualizations (NFV), a VNF may be supported by network function virtualizations infrastructure (NFVI) having various types of physical elements such as processors, storage or memory provisioned or composed to form VRs to support the VNF. For these examples, the VNF and NFVI may be operated or hosted by separate entities. As a result, traditional management architectures and management functions may not work well since some important performance measurements (PMs) for NFVI supporting the VNF may not be available for measuring by the entity hosting the NFV. For example, mean/peak processor usage for processors composed (e.g., vCPUs) to form at least part of a VR arranged to support the VNF. These PMs may be important in order to deliver consistent and acceptable service quality to end users of a 3GPP wireless network, as well as to timely isolate and correct failure conditions. Also, the PMs may be needed to reflect ways in which the VNF may be impacted by the performance (or lack thereof) of VRs composed from physical elements in the NFVI to support the VNF. Therefore, PMs need to be measured and accessible for both the VNF and for VRs composed from physical elements in the NFVI to effectively and/or efficiently implement a management architecture and/or management functions in a virtualized wireless network. It is with respect to these challenges that the examples described herein are needed.

In some first examples, methods may be implemented that include receiving first PM data for a VNF and receiving second PM data for NFVI arranged to support the VNF. These methods may also include determining whether to initiate a network services (NS) lifecycle management (LCM) operation with a network functions virtualization orchestrator (NFVO) or a VNF LCM operation with virtualized network function manager (VNFM) (e.g., both located with ETSI MANO entities) based on performing a PM data correlation and detection of threshold crossing function using the first and/or the second PM data. As described more below either an element manager (EM) or network manager (NM) of a 3GPP wireless network may include logic and/or features to receive the first and second PM data and perform the detection of threshold crossing function to determine whether to initiate the NS or VNF LCM operation.

In some second examples, methods may be implemented that include receiving, at a virtualized infrastructure manager (VIM) for managing NFVI, PM data generated by the NFVI while the NFVI supports one or more VNFs. These methods may also include forwarding the PM data to an NFVO if the PM data is related to a network service provided by the one or more VNFs and forwarding the PM data to a VNFM arranged to manage the one or more VNFs if the PM data is related to one or more VRs composed from the NFVI and consumed while the VRs support the one or more VNFs. Both the VIM and NFVO may be located with ETSI MANO entities. As described more below, the NFVO and the VNFM may forward their respectively received PM data related to an EM or to an NM of a 3GPP wireless network for the EM or the NM to implement a PM data correlation and detection of threshold crossing function using the received PM data to determine whether to initiate an NS or VNF LCM operation.

FIG. 1 illustrates an example first system 100. In some examples, as shown in FIG. 1, system 100 includes 3GPP OAM 101 and ETSI MANO 103. For these examples, 3GPP OAM 101 and ETSI MANO 103 may include entities of a virtualized 3GPP specified core wireless network, for example, as described in ETSI, group specification (GS), Network Functions Virtualisation (NFV); Management and Orchestration 001, V1.1.1, published in December of 2014, and/or previous or subsequent releases or versions (hereinafter referred to as ETSI GS NFV-MAN 001) or as described in 3GPP technical review (TR) 32.842, entitled "Technical Specification Group Services and System Aspects; Telecommunication management; Study on network management or virtualized networks", Release 13, V1.0.0, published in March of 2015, and/or previous or subsequent releases or versions (hereinafter referred to as 3GPP TR 32.842). For example, as shown in FIG. 1, the 3GPP OAM 101 entities may include a network manager (NM) 101, an element manager (EM) 120, a virtualized network function (VNF) 130 or a network functions virtualization infrastructure (NFVI) 140. Also, as shown in FIG. 1, ETSI MANO 103 entities may include a network functions virtualization orchestrator (NFVO) 150, a virtualized network function manager (VNFM) 160 and a virtualized infrastructure manager (VIM) 170.

According to some examples, NM 110 may be coupled with EM 120 via communication link (C.L.) 112 and with NFVO 150 via C.L. 144. EM 120 may be coupled with VNF 130 via C.L. 122 and with VNFRM 160 via C.L. 124. VNF 130 may be coupled with NFVI 140 via C.L. 132 and with VNFM 160 via C.L. 134. NFVI 140 may be coupled with VIM 170 via C.L. 144. Also, VIM 170 may be coupled with NFVO 150 via C.L. 172. The above-mentioned communication links may be wireless, wired or a combination of wireless/wired communication links to enable the various entities of 3GPP OAM 101 and ETSI MANO 103 to communicatively couple with each other.

In some examples, NM 110 may be arranged to manage various entities within a 3GPP wireless network such as EM 120. NM 110 may provide a package of functions with a responsibility for management of the 3GPP wireless network that may include network elements with virtualized network functions (e.g., VNF 130) or non-virtualized network functions (e.g., EM 120) or both. The management provided by NM 110 may occur through one or more EMs such as EM 120 but may also involve direct access to the network elements. Communications within the 3GPP wireless network may be based on open and well-standardized interfaces supporting management of multi-vendor and multi-technology network elements such as those possibly included in NFVI 140 or in other entities of 3GPP OAM 101 or ETSI MANO 103.

In some examples, EM 120 may be arranged as a discrete telecommunications entity, which may be managed by NM 110 through a specific interface, e.g. Itf-N. EM 120 may be arranged to manage one or more VNFs such as VNF 130.

According to some examples, VNF 130 may represent one or more VNFs deployed on or using NFVI 140. For these examples, NFVI 140 may include hardware (physical elements) and software components which may be provisioned to compose virtualized resources (VRs) such as one or more virtual machines in which the one or more VNFs of VNF 130 may be supported. In that regard, a given VNF may be supported by one or more virtual machines and may be chained with other VNFs and/or physical, non-virtualized network functions to realize or provide a network service such as, but not limited to, e-mail services, virus scanning services, web hosting services or data services. Components included in NFVI 140 may include possibly disaggregated physical elements that may span several locations such as processors, memory, storage, or network switching and may be hosted on multiple compute hosts or servers. Also, network resources that provide connectivity between these locations may be regarded as part of NFVI 140. These disaggregated physical elements may be provisioned to execute a plurality of different types of virtualized resources composed or arranged to support the one or more VNFs included in VNF 130 as these one or more VNFs provide a network service.

In some examples, NFVO 150 is an entity of ETSI MANO 103 that may be arranged to orchestrate VR or network services included in NFVIs such as NFVI 140 across multiple VIMs that may include VIM 170. NFVO 150 may also be arranged to implement network services (NS) LCM operation(s) 155. NS LCM operation(s) 155 may include, but are not limited to, instantiate network service, terminate network service, query network service, scale network service, update network service, create VNF forwarding graph (VNFFG), delete VNFFG, query VNFFG, update VNFFG, create virtual link (VL), delete VL, update VL or query VL.

According to some examples, VNFM 160 is an entity of ETSI MANO 103 that may be arranged to manage one or more VNFs such as VNFs included in VNF 130. VNFM 160 may also be arranged to implement VNF LCM operation(s) 165. VNF LCM operation(s) 165 may include, but are not limited to, instantiate VNF instance, terminate VNF instance, query VNF instance, scale VNF instance or update VNF instance.

In some examples, VIM 170 is an entity of ETSI MANO 103 that may be arranged to control or manage NFVI 140. This control or management may occur within one or more operator infrastructure domains. VIM 170 may be able to receive PM data from PM data producers 145 that may include PM data related to a network service provided by the one or more VNFs included in VNF 130. The PM data received from PM data producers 145 may also include PM data related to VRs included in NFVI 140 that may be consumed while NFVI 140 supports the one or more VNFs included in VNF 130. As described more below, logic and/or features of VIM 170 may be capable of splitting the received PM data based on whether the PM data is related to the network service or is related to the VRs.

According to some examples, as described more below, PM data from PM data producer(s) 135 at VNF 130 and PM data producer(s) 145 at NFVI 140 may be received by NM 110. NM 110 may receive the PM data from EM 120 or from entities at ETSI MANO 103 (e.g., routed through VIM 170, NFVO 150). For these examples, logic and/or features of NM 110 may implement or perform a PM data correlation and detection of threshold crossing function using the received PM data to determine whether to initiate NS LCM operation(s) 155 with NFVO 150.

In some examples, as described more below, PM data from PM data producer(s) 135 at VNF 130 and PM data producer(s) 145 may be either directly received by EM 120 from VNF 130 or may be routed through entities at ETSI MANO 103 (e.g., routed through VIM 170 and VNFM 160) and then received by EM 120. For these examples, logic and/or features of EM 120 may implement or perform a PM data correlation and detection of threshold crossing function using the received PM data to determine whether to initiate VNF LCM operation(s) 165 with VNFM 160. In some alternative examples, EM 120 may recommend to NM 110 that VNF LCM operation(s) 165 be initiated at VNFM 160. For these alternatives, responsive to this recommendation, EM 120 may cause NFVO 150 to initiate VNF LCM operation(s) 165 at VNFM 160.

According to some examples, as shown in FIG. 1, VNFM 160 may also directly receive PM data generated by PM data producer(s) 165 from VNF 130. For these examples, VNFM 160 may then forward the PM data to NFVO 150. NFVO 150 may then use this PM data to orchestrate network services provided by the one or more VNFs included in VNF 130. In some examples, NFVO 150 may initiate NS LCM operation(s) 155 based on the PM data forwarded from VNFM 160.

Figure 2:
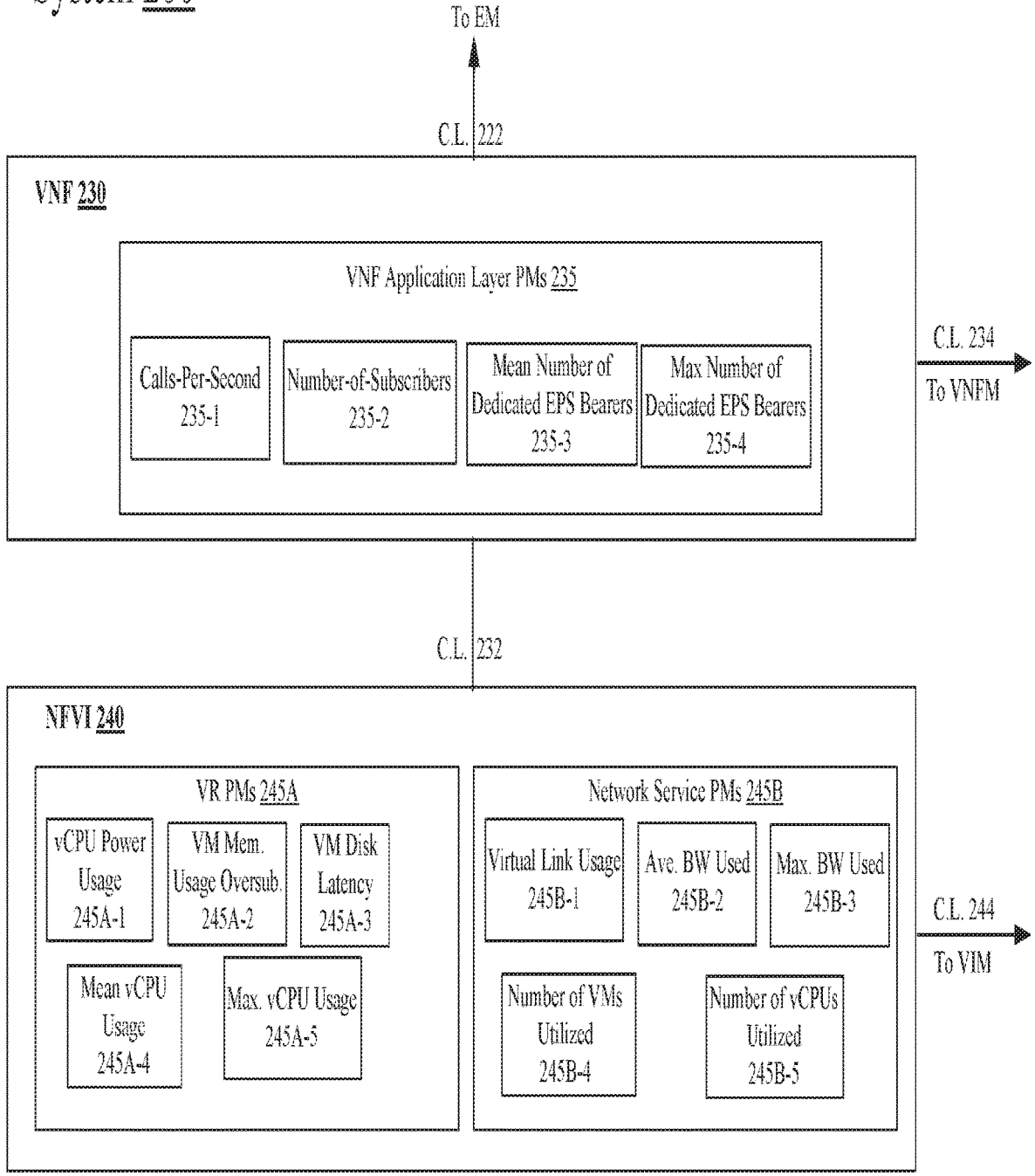
FIG. 2 illustrates an example of a second system.

FIG. 2 illustrates an example second system 200. In some examples, as shown in FIG. 2, system 200 includes a VNF 230 and an NFVI 240. For these examples, VNF 230 and NFVI 240 may be entities included in a 3GPP OAM such as 3GPP OAM 101 shown in FIG. 1 and these entities may be coupled with other entities within the 3GPP OAM or within an ETSI MAN such as ETSI MAN 103. For example, as shown in FIG. 2, VNF 230 may be coupled with an EM via C.L. 222 and with a VNFM via C.L. 234. Also as shown in FIG. 2, NFVI 240 may be coupled with VNF 230 via C.L. 232 and with a VIM via C.L. 244.

According to some examples, VNF 230 may include VNF application layer PMs 235 as shown in FIG. 2. For these examples, VNF application layer PMs 235 may reflect VNF application layer performance and may be sources of PM data produced or generated by one or more VNFs of VNF 230 while providing a network service to indicate the VNF application layer performance. For example, VNF application layer PMs 235 may include calls-per-second 235-1, number-of-subscribers 235-2, mean number of dedicated EPS bearers 235-3 or maximum number of dedicated EPS bearers 235-4. Examples are not limited to the various PM data sources included in VNF application layer PMs 235, other and/or additional PM data sources are contemplated. As described more below, VNF 230 may report or send PM data related to VNF application layer performance to an EM and/or to a VNFM.

In some examples, NFVI 240 may include VR PMs 245A as shown in FIG. 2. For these examples, VR PMs 245A may include various PMs related to VRs included in NFVI 240 consumed while supporting the one or more VNFs of VNF 230. In other words, VR PMs 245A may be associated with the one or more VNFs that consume VRs included in NFVI 240. For example, virtualized resource PMs 245A may include virtual central processing unit (vCPU) power usage 245A-1, virtual memory (VM) usage oversubscription 245A-2, VM disk latency 245A-3, mean vCPU usage 245A-4 or maximum vCPU usage 245A-5. Examples are not limited to the various PM data sources for VRs included in VR PMs 245A, other and/or additional PM data sources are contemplated. As described more below, a VIM may receive PM data from NFVI 240 having VR PMs and may forward the PM data to a VNFM such as VNFM 160 in an ETSI MANO based on the PM data including VR PMs. As described more below, VNFM 160 may forward the VR PM data to EM 120 managing the one or more VNFs for which consume the VRs associated with the VR PM data.

According to some examples, NFVI 240 may also include network service PMs 245B as shown in FIG. 2. For these examples, network service PMs 245B may include various PMs related to a network service provided by the one or more VNFs of VNF 230. For example, network service PMs 245B may include virtual link usage 245B-1, average bandwidth used 245B-2, maximum bandwidth used 245B-3, number of VMs utilized 245B-4 or number of vCPUs utilized 245B-5. Examples are not limited to the various PM data sources included in network service PMs 245B, other and/or additional PM data sources are contemplated. As described more below, a VIM may receive PM data from NFVI 240 having PMs related to a network service and may forward the PM data to another entity in an ETSI MANO based on the PM data including the PMs related to the network service.

Figure 3:
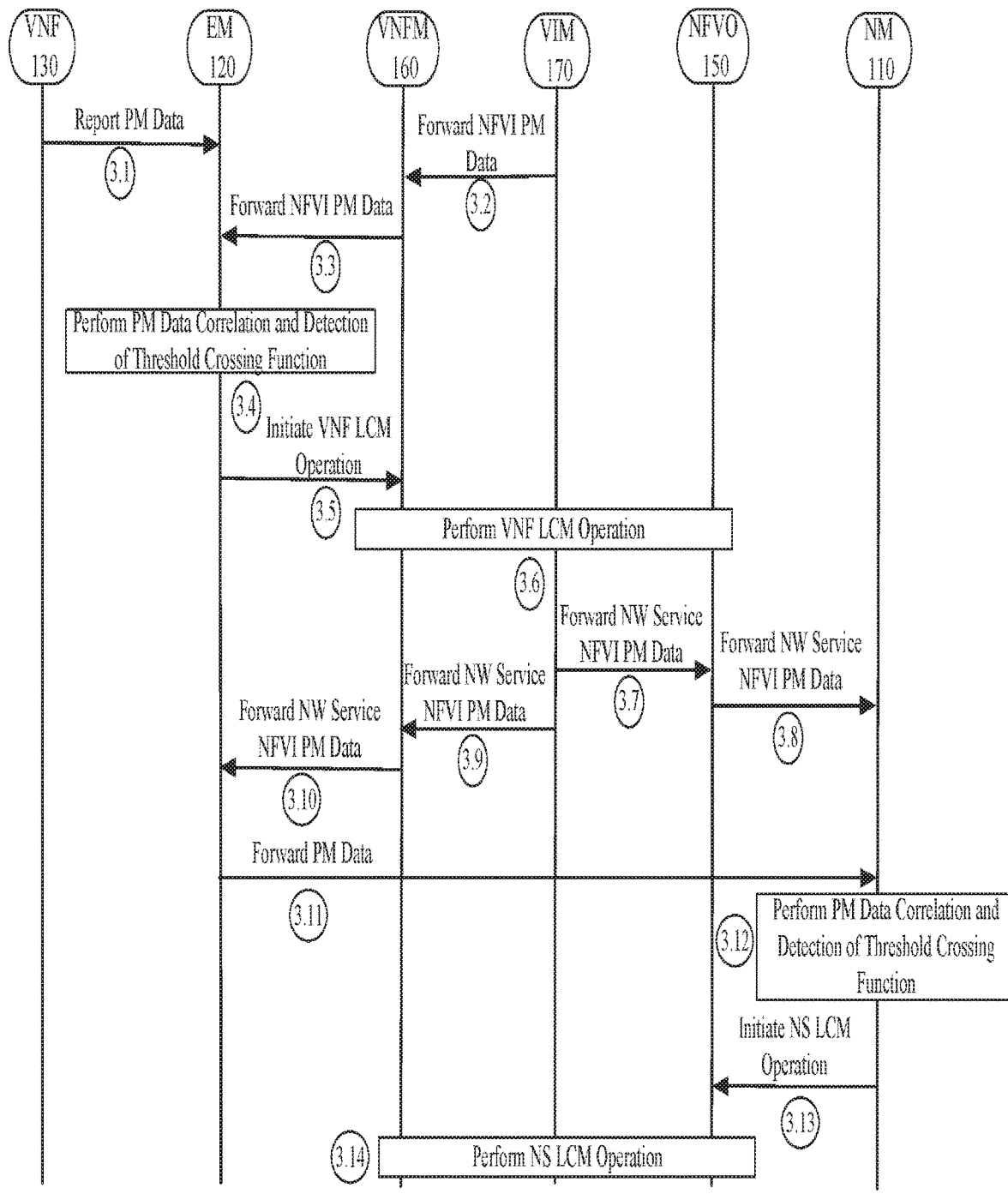
FIG. 3 illustrates an example process.

FIG. 3 illustrates an example process 300. Process 300 may be for monitoring VNF or NFVI based on received PM data and determining whether to initiate a VNF LCM operation based on the received PM and based on performing a PM data correlation and detection of threshold crossing function. For these examples, elements of system 100 as shown in FIG. 1 such as NM 110, EM 120, VNF 130, NFVI 140, NFVO 150, VNFM 160 or VIM 170 may be related to process 300. Also types of PM data as described for and shown in FIG. 2 for system 200 may also be related to process 300. However, the example process 300 is not limited to implementations using elements of system 100 or the types of PM data for system 200 shown in FIGS. 1-2.

Beginning at process 3.1 (Report PM Data), logic and/or features of VNF 130 may be arranged to report PM data to EM 120 for a VNF arranged to provide a network service. In some examples, the reported PM data may be related to VNF application layer performance while providing the network service such as PMs included in VNF application layer PMs 235.

Moving to process 3.2 (Forward NFVI PM Data), logic and/or features of VIM 170 may be arranged to forward received NFVI PM data to VNFM 160. In some examples, the NFVI PM data may include PM data related to one or more VRs composed from NFVI (from processors, memory, storage, etc.) and consumed while supporting the VNF. For these examples, NFVI PM data may include PM data such as that shown in FIG. 2 for VR PMs 245A.

Moving to process 3.3 (Forward NFVI PM Data), logic and/or features at VNFM 160 may forward NFVI PM data to EM 120 that may be arranged to manage the VNF with which the VR PM data is associated.

Moving to process 3.4 (Perform PM Data Correlation and Detection of Threshold Crossing Function), logic and/or feature at EM 120 may perform or implement a PM data correlation and detection of threshold crossing function using the PM data received from VNF 130 and/or the NFVI PM data forwarded from VNFM 160. For these examples, the PM data correlation and detection of threshold crossing function may characterize network performance by correlating large numbers of received PMs. A threshold may be set for one, multiple or combinations of multiple types of PMs to monitor certain performance measurements. The threshold, for example, may be tied to one or more quality of service (QoS) or service level agreement (SLA) requirements that may dictate a desirable level of performance that should be maintained. A detection of a threshold crossing on a PM, groups of PMs or multiple types of PMs may be an indication of performance degradation or of recovery of some fault condition and may trigger actions to mitigate network performance. For example, VM disk latency indicated in PMs for VRs composed from NFVI 140 may exceeds a threshold that triggers actions or calls-per-second handled by the VNF fall below a threshold that triggers actions. A type of action triggered to mitigate network performance may be a VNF LCM operation as described in ETSI GS NFV-MAN 001 or TR 32.842.

Moving to process 3.5 (Initiate VNF LCM Operation), logic and/or features of EM 120 may have determined that a VNF LCM operation was needed based on implementation of the PM data correlation and detection of threshold crossing function using the PM data received from VNF 130 and/or the NFVI PM data forwarded through VNFM 160.

Moving to process 3.6 (Perform VNF LCM Operation), logic and/or features of VNFM 160, VIM 170 and NFVO may be arranged to perform at least portions of the VNF LCM operation initiated by EM 120. In some examples, the VNF LCM operation may include, but is not limited to, instantiate VNF instance, terminate VNF instance, query VNF instance, scale VNF instance or update VNF instance.

Moving to process 3.7 (Forward NW Service NFVI PM Data), logic and/or features of VIM 170 may forward network service NFVI PM data to NFVO 150. In some examples, PM data related to the network service may be PM data such as that included in network service PMs 245B that are related to the network service provided by the VNF of VNF 130.

Moving to process 3.8 (Forward NW Service NFVI PM Data), logic and/or features of NFVO 150 may forward the network service NFVI PM data to NM 110.

Moving to process 3.9 (Forward NW Service NFVI PM Data), logic and/or features of VIM 170 may also forward the network service NFVI PM data to VNFM 160.

Moving to process 3.10 (Forward NW Service NFVI PM Data), logic and/or features of VNFM 160 may forward the network service NFVI PM data to EM 120.

Moving to process 3.11 (Forward PM Data), logic and/or features of EM 120 may forward PM data to NM 110. In some examples, the PM data may include VNF application layer performance PMs as mentioned above for process 3.1. The PM data may also include PM data related to one or more VRs composed from NFVI and consumed while supporting the VNF as mentioned above for process 3.2.

Moving to process 3.12 (Perform PM Data Correlation and Detection of Threshold Crossing Function), logic and/or features of NM 110 may perform or implement a PM data correlation and detection of threshold crossing function using the PM data forwarded from EM 120 and/or the NFVI PM data forwarded from VNFO 150. For these examples, the PM data correlation and detection of threshold crossing function may be similar to the function performed by EM 120 in process 3.4. Also, actions may be triggered based on results of the PM data correlation and detection of threshold crossing function mentioned above for process 3.4. For examples a type of action triggered to mitigate network performance may be an NS LCM operation as described in ETSI GS NFV-MAN 001 or TR 32.842.

Moving to process 3.13 (Initiate NS LCM Operation), logic and/or features of NM 110 may have determined that an NS LCM operation was needed based on implementation of the PM data correlation and detection of threshold crossing function using the PM data forwarded from EM 120 and/or the network service NFVI PM data forwarded through NFVO 150.

Moving to process 3.14 (Perform NS LCM operation), logic and/or features of VNFM 160, VIM 170 and NFVO may be arranged to perform at least portions of the NS LCM operation initiated by NM 110. In some examples, the NS LCM operation may include, but is not limited to, instantiate network service, terminate network service, query network service, scale network service, update network service, create VNFFG, delete VNFFG, query VNFFG, update VNFFG, create VL, delete VL, update VL or query VL. Process 300 may then come to an end.

Figure 4:
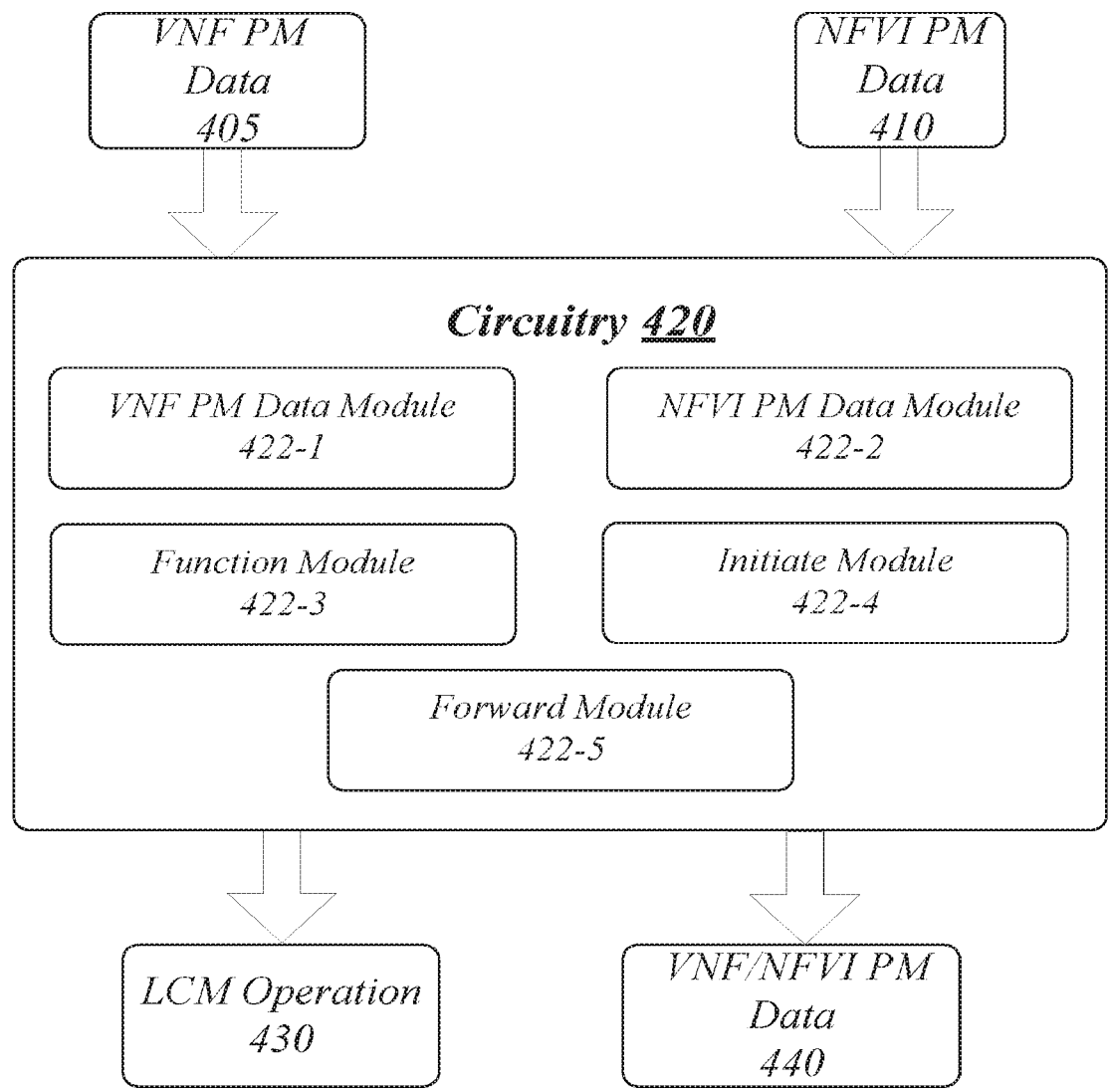
FIG. 4 illustrates an example block diagram for a first apparatus.

FIG. 4 illustrates a block diagram for an example first apparatus. As shown in FIG. 4, the example first apparatus includes apparatus 400. Although apparatus 400 shown in FIG. 4 has a limited number of elements in a certain topology, it may be appreciated that the apparatus 400 may include more or less elements in alternate topologies as desired for a given implementation.

The apparatus 400 may comprise an apparatus 400 having a circuitry 420 that may represent a portion of logic in hardware that may be generally arranged to execute one or more other portions of logic that may include modules 422-$a$. It is worthy to note that "a" and "b" and "c" and similar designators as used herein are intended to be variables representing any positive integer. Thus, for example, if an implementation sets a value for a=5, then a complete set of modules 422-$a$ included in the one or more other portions of logic may include modules 422-1, 422-2, 422-3, 422-4 or 422-5. The examples are not limited in this context.

According to some examples, apparatus 400 may be implemented in network equipment for an NM or EM for a 3GPP wireless network (e.g., NM 110 or EM 120). The EM or NM may be a functional entity for 3GPP OAM operated as described in ETSI GS NFV-MAN 001 or 3GPP TR 32.842. The examples are not limited in this context.

In some examples, as shown in FIG. 4, apparatus 400 includes circuitry 420. Circuitry 420 can be any of various commercially available processors, including without limitation an AMD® Athlon®, Duron® and Opteron® processors; ARM® application, embedded and secure processors; Qualcomm® Snapdragon, IBM®, Motorola® DragonBall®, Nvidia®Tegra® and PowerPC® processors; IBM and Sony® Cell processors; Intel® Celeron®, Core (2) Duo®, Core i3, Core i5, Core i7, Itanium®, Pentium®, Xeon®, Atom®, and XScale® processors; and similar processor. Dual microprocessors, multi-core processors, and other multi-processor architectures may also be employed as circuitry 420. According to some examples, circuitry 420 may also be an application specific integrated circuit (ASIC) and at least some modules 422-$a$ may be implemented as hardware elements of the ASIC.

According to some examples, the logic of apparatus 400 may include a VNF PM data module 422-1. VNF PM data module 422-1 may be executed by circuitry 420 to receive VNF PM data for a VNF. For these examples, the VNF PM data may be for a VNF arranged to provide a network service for the 3GPP wireless network. The VNF PM data, if directed to an EM, may be received directly from a VNF entity of a 3GPP OAM. The VNF PM data, if directed to an NM, may be forwarded through an EM that is coupled with the VNF entity. The VNF PM data may be included in VNF PM data 405 and may be related to VNF application layer performance to include, but not limited to, calls-per-second, number-of-subscribers, mean number of dedicated EPS bearers in active mode or maximum or peak number of dedicated EPS bearers in active mode.

In some examples, the logic of apparatus 400 may also include an NFVI PM data module 422-2. NFVI PM data module 422-2 may be executed by circuitry 420 to receive PM data for NFVI arranged to support the VNF. For these examples, the NFVI PM data may be included in NFVI PM data 410 and may include PM data related to one or more VRs composed from the NFVI and consumed while supporting the VNF. This VR related PM data may include vCPU power consumption, VM memory usage oversubscription, VM disk latency, mean vCPU usage or maximum or peak vCPU usage. The NFVI PM data may also be related to network services provided by the VNF. The network services related PM data may include latency of one or more VLs supporting the one or more VNFs, usage of the one or more VLs supporting the one or more VNFs, average bandwidth used by the VNF to provide the network service over a time interval, peak bandwidth used by the VNF to provide the network service over the time interval, number of VMs utilized or composed for the VNF to provide the network service or vCPUs utilized or composed for the VNF to provide the network service.

According to some examples, the logic of apparatus 400 may also include a function module 422-3. Function module 422-3 may be executed by circuitry 420 to implement or perform a PM data correlation and detection of threshold crossing function to determine whether to initiate a VNF or NS LCM operation with an NFVO or a VNFM. For these examples, the PM data correlation and detection of threshold crossing function may be implemented using the PM data included in VNF PM data 405 and/or NFVI PM data 410.

In some examples, the logic of apparatus 400 may also include an initiate module 422-4. Initiate module 422-4 may be executed by circuitry 420 to initiate the VNF or NS LCM operation with the NFVO or the VNFM. For these examples, initiate module may have determined that a VNF or NS LCM operation was needed based on implementation of the PM data correlation and detection of threshold crossing function by function module 422-3 using the PM data included in VNF PM data 405 and/or NFVI PM data 410. For example, average bandwidth used by the VNF to provide the network service over a time interval as indicated in NFVI PM data 410 may be below an average bandwidth threshold and corrective actions may be needed that may include an NS LCM operation initiated by sending LCM operation 430 to the NFVO or may include a VNF LCM operation initiated by sending LCM operation 430 to the VNFM.

According to some examples, the logic of apparatus 400 may also include forward module 422-5. Forward module 422-5 may be executed by circuitry 420 to forward VNF/NFVI PM data to an NM for the 3GPP wireless network. For these examples, apparatus 400 may be included in an EM for the 3GPP wireless network and the VNF/NFVI PM data received in VNF PM data 405 and NFVI PM data 410 may be forwarded to the NM via VNF/NFVI PM data 440. Also for these examples, the NM may also perform or implement the PM data correlation and detection of threshold crossing function using the VNF/NFVI PM data to determine whether a VNF LCM operation needs to be initiated with NFVO.

Various modules of apparatus 400 and a device implementing apparatus 400 may be communicatively coupled to each other by various types of communications media to coordinate operations. The coordination may involve the uni-directional or bi-directional exchange of information. For instance, the modules may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 5:
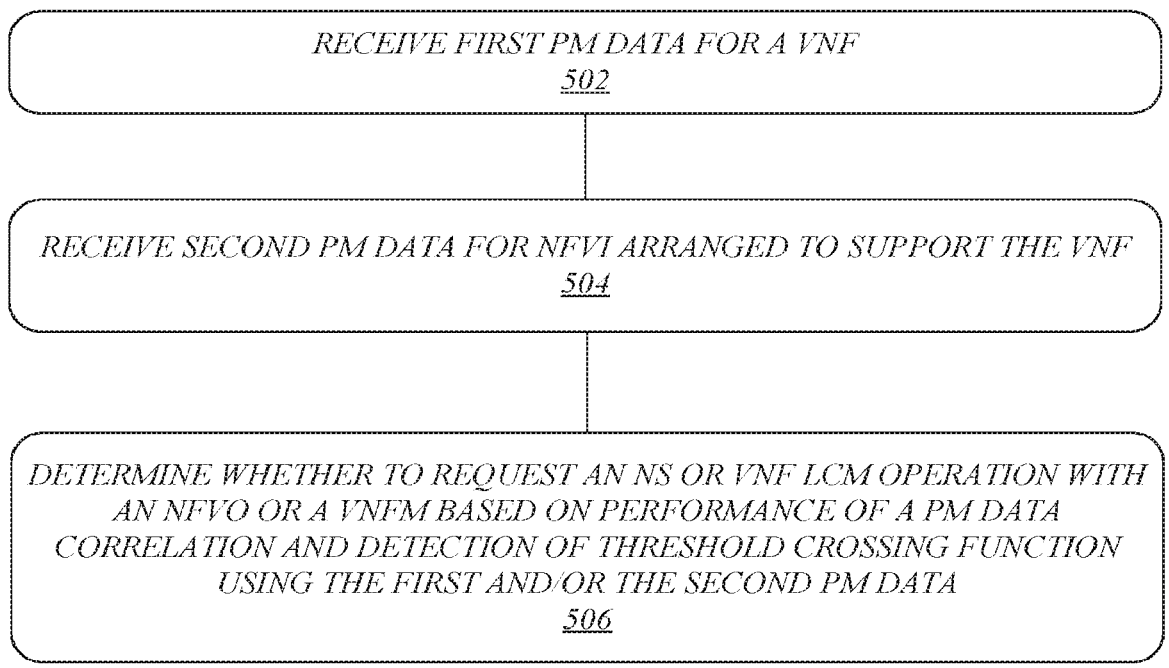
FIG. 5 illustrates an example of a first logic flow.

FIG. 5 illustrates an example of a first logic flow. As shown in FIG. 5, the first logic flow includes logic flow 500. Logic flow 500 may be representative of some or all of the operations executed by one or more logic, features, or devices described herein, such as apparatus 500. More particularly, logic flow 500 may be implemented by VNF PM module 422-1, NFVI PM data module 422-2, function module 422-3 or initiate module 422-4.

In the illustrated example shown in FIG. 5, logic flow 500 at block 502 may receive first PM data for a VNF. In some examples, VNF PM data module 422-1 may receive the first PM data.

According to some examples, logic flow 500 at block 504 may receive second PM data for NFVI arranged to support the VNF. For these examples, NFVI PM data module 422-2 may receive the second PM data.

In some examples, logic flow 500 at block 506 may determine whether to request an NS or VNF LCM operation with an NFVO or a VNFM based on performance of a PM data correlation and detection of threshold crossing function using the first and/or the second PM data. For these examples, initiate module 422-4 may determine whether to initiate the NS or VNF LCM operation based on function module 422-3 performing the PM data correlation and detection of threshold crossing function using the first and/or second PM data.

FIG. 6 illustrates an embodiment of a first storage medium. As shown in FIG. 6, the first storage medium includes storage medium 600. Storage medium 600 may comprise an article of manufacture. In some examples, storage medium 600 may include any non-transitory computer readable medium or machine readable medium, such as an optical, magnetic or semiconductor storage. Storage medium 600 may store various types of computer executable instructions, such as instructions to implement logic flow 500. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 7:
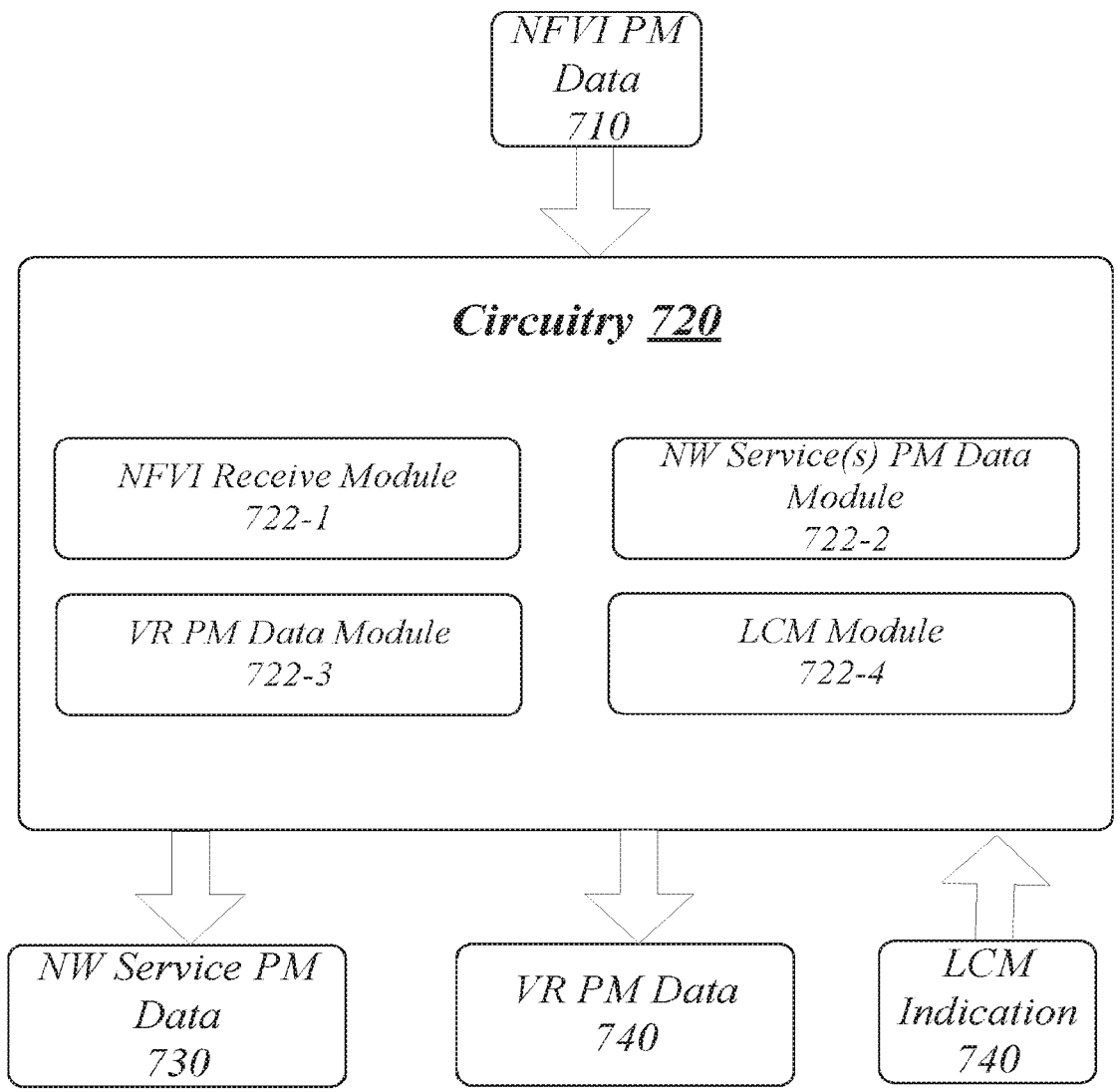
FIG. 7 illustrates an example block diagram for a second apparatus.

FIG. 7 illustrates a block diagram for an example second apparatus. As shown in FIG. 7, the example second apparatus includes apparatus 700. Although apparatus 700 shown in FIG. 7 has a limited number of elements in a certain topology, it may be appreciated that the apparatus 700 may include more or less elements in alternate topologies as desired for a given implementation.

The apparatus 700 may comprise an apparatus 700 having a circuitry 720 that may represent a portion of logic in hardware that may be generally arranged to execute one or more other portions of logic that may include modules 722-a. It is worthy to note that "a" and "b" and "c" and similar designators as used herein are intended to be variables representing any positive integer. Thus, for example, if an implementation sets a value for a=4, then a complete set of modules 722-a included in the one or more portions of logic may include modules 722-1, 722-2, 722-3 or 722-4. The examples are not limited in this context.

According to some examples, apparatus 700 may be implemented with or located at network equipment for a VIM arranged to manage NFVI supporting one or more VNFs (e.g., VIM 170). The VIM may be a functional entity for an ETSI MANO operated as described in ETSI GS NFV-MAN 001 or 3GPP TR 32.842. The examples are not limited in this context.

In some examples, as shown in FIG. 7, apparatus 700 includes circuitry 720. Circuitry 720 can be any of various commercially available processors to include but not limited to the processors mentioned above for apparatus 400. Also, according to some examples, circuitry 720 may also be an ASIC and at least some modules 722-a may be implemented as hardware elements of the ASIC.

According to some examples, the logic of apparatus 700 may include a NFVI receive module 722-1. NFVI receive module 722-1 may be executed by circuitry 720 to receive PM data generated by NFVI while the NFVI supports one or more VNFs. For these examples, the PM data may be included in NFVI PM data 710.

In some examples, the logic of apparatus 700 may also include a network (NW) service(s) PM data module 722-2. NW service(s) PM data module 722-2 may be executed by circuitry 720 to forward PM data to an NFVO if the PM data is related to a network service provided by the one or more VNFs. For these examples, NW service PM data 730 may include the PM data related to the network service provided by the one or more VNFs.

According to some examples, the logic of apparatus 700 may also include a VR PM data module 722-3. VR PM data module 722-3 may be executed by circuitry 720 to forward the PM data to a VNFM arranged to manage the one or more VNFs if the PM date is related to one or more VRs composed from the NFVI and consumed while the VR supports the one or more VNFs. For these examples, VR PM data 740 may include the PM data related to the one or more VRs.

In some examples, the logic of apparatus 700 may also include an LCM module 722-4. LCM module 722-4 may be executed by circuitry 720 to perform an NS or VNF LCM operation that may have been initiated by an EM or an NM for a 3GPP wireless network for which the one or more VNFs are providing the network service. For these examples, the NS or VNF LCM operation may have been initiated responsive to the EM or NM implementing a PM data correlation and detection of threshold crossing function using the PM data included in NW service PM data 730 or VR PM data 740. In some examples, LCM indication 740 may have been forwarded from a VNFM for the VIM to perform an NS LCM operation which may include instantiate network service, terminate network service, query network service, scale network service, update network service, create VNFFG, delete VNFFG, query VNFFG, update VNFFG, create VL, delete VL, update VL or query VL. In some other examples, LCM indication 740 may have been forwarded from the VNFM for the VIM to perform a VNF LCM operation which may include instantiate network service, terminate VNF instance, query VNF instance, scale VNF instance or update VNF instance Various modules of apparatus 700 and a device implementing apparatus 800 may be communicatively coupled to each other by various types of communications media to coordinate operations. The coordination may involve the uni-directional or bi-directional exchange of information. For instance, the modules may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

FIG. 8 illustrates an example of a second logic flow. As shown in FIG. 8, the second logic flow include logic flow 800. Logic flow 800 may be representative of some or all of the operations executed by one or more logic, features, or devices described herein, such as apparatus 700. More particularly, logic flow 800 may be implemented by NFVI receive module 722-1, NW service(s) PM data module 722-2 or VR PM module 722-3.

In the illustrated example shown in FIG. 8, logic flow 800 at block 802 may receive PM data generated by an NFVI while the NFVI supports one or more VNFs. In some examples, the PM data may be received by NFVI receive module 722-1.

According to some examples, logic flow 800 at block 804 may forward the PM data to an NFVO if the PM data is related to a network service provided by the one or more VNFs. For these examples, NW service(s) PM data module 722-2 may forward the PM data.

In some examples, logic flow 800 at block 806 may forward the PM data to a VNFM arranged to manage the one or more VNFs if the PM data is related to one or more VRs composed from the NFVI and consumed while the VR supports the one or more VNF S. For these examples, VR PM data module 722-3 may forward the PM data.

FIG. 9 illustrates an embodiment of a second storage medium. As shown in FIG. 9, the second storage medium includes storage medium 900. Storage medium 900 may comprise an article of manufacture. In some examples, storage medium 900 may include any non-transitory computer readable medium or machine readable medium, such as an optical, magnetic or semiconductor storage. Storage medium 900 may store various types of computer executable instructions, such as instructions to implement logic flow 800. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 10:
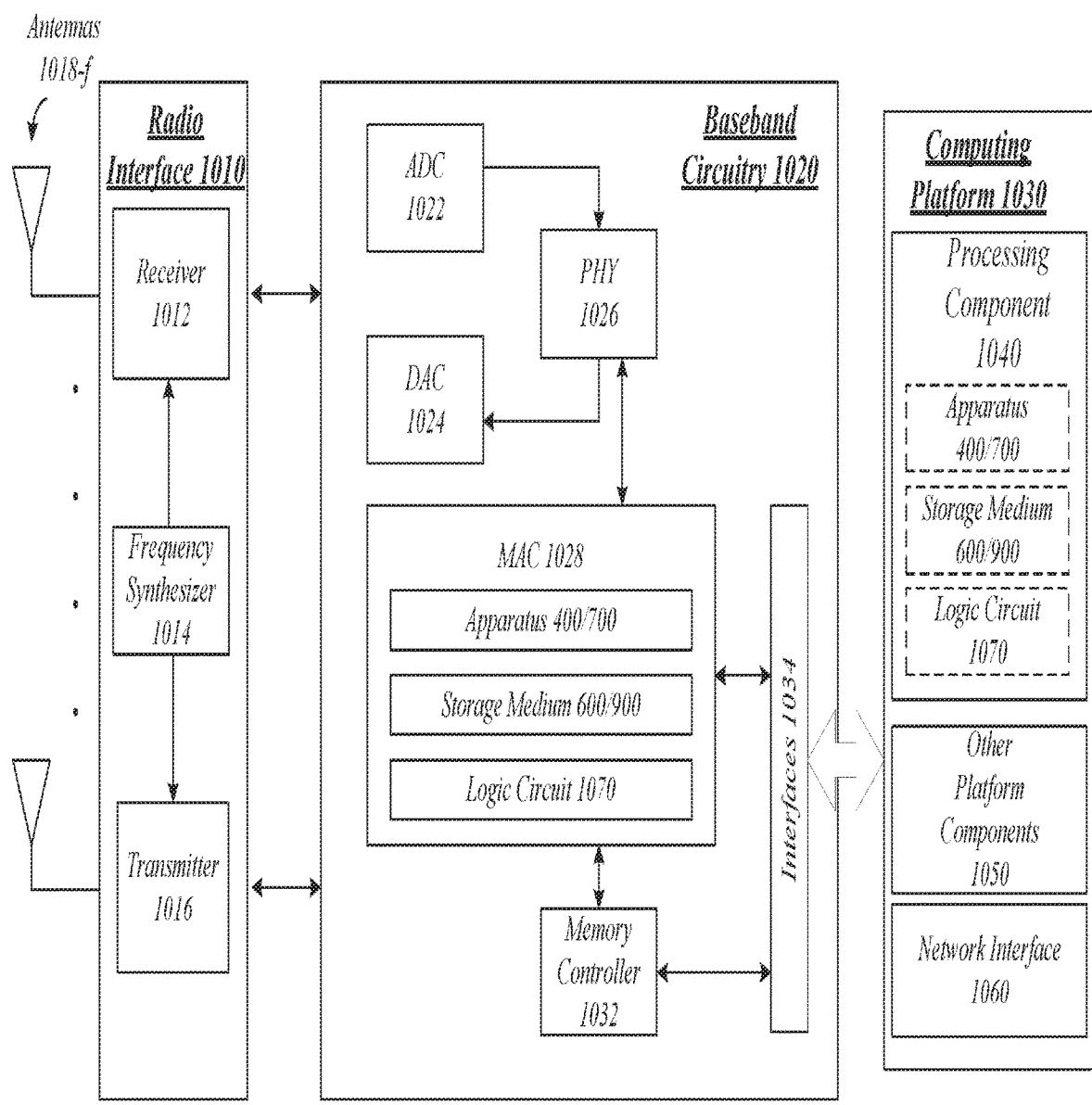
FIG. 10 illustrates an example of a device.

FIG. 10 illustrates an embodiment of a device 1000 for use in a broadband wireless access network. Device 1000 may implement, for example, apparatus 400/700, storage medium 600/900 and/or a logic circuit 1070. The logic circuit 1070 may include physical circuits to perform operations described for apparatus 400/700. As shown in FIG. 10, device 1000 may include a radio interface 1010, baseband circuitry 1020, and computing platform 1030, although examples are not limited to this configuration.

The device 1000 may implement some or all of the structure and/or operations for the apparatus 400/700, storage medium 600/900 and/or logic circuit 1070 in a single computing entity, such as entirely within a single device. Alternatively, the device 1000 may distribute portions of the structure and/or operations for apparatus 400/700, storage medium 600/900 and/or logic circuit 1070 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The examples are not limited in this context.

In one embodiment, radio interface 1010 may include a component or combination of components adapted for transmitting and/or receiving single carrier or multi-carrier modulated signals (e.g., including complementary code keying (CCK) and/or orthogonal frequency division multiplexing (OFDM) symbols and/or single carrier frequency division multiplexing (SC-FDM) symbols) although the embodiments are not limited to any specific over-the-air interface or modulation scheme. Radio interface 1010 may include, for example, a receiver 1012, a transmitter 1016 and/or a frequency synthesizer 1014. Radio interface 1010 may include bias controls, a crystal oscillator and/or one or more antennas 1018-$f$. In another embodiment, radio interface 1010 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1020 may communicate with radio interface 1010 to process receive and/or transmit signals and may include, for example, an analog-to-digital converter 1022 for down converting received signals, a digital-to-analog converter 1024 for up converting signals for transmission. Further, baseband circuitry 1020 may include a baseband or physical layer (PHY) processing circuit 1026 for PHY link layer processing of respective receive/transmit signals. Baseband circuitry 1020 may include, for example, a processing circuit 1028 for medium access control (MAC)/data link layer processing. Baseband circuitry 1020 may include a memory controller 1032 for communicating with MAC processing circuit 1028 and/or a computing platform 1030, for example, via one or more interfaces 1034.

In some embodiments, PHY processing circuit 1026 may include a frame construction and/or detection module, in combination with additional circuitry such as a buffer memory, to construct and/or deconstruct communication frames (e.g., containing subframes). Alternatively or in addition, MAC processing circuit 1028 may share processing for certain of these functions or perform these processes independent of PHY processing circuit 1026. In some embodiments, MAC and PHY processing may be integrated into a single circuit.

Computing platform 1030 may provide computing functionality for device 1000. As shown, computing platform 1030 may include a processing component 1040. In addition to, or alternatively of, baseband circuitry 1020 of device 1000 may execute processing operations or logic for apparatus 400/700, storage medium 600/900, and logic circuit 1070 using the processing component 1040. Processing component 1040 (and/or PHY 1026 and/or MAC 1028) may comprise various hardware elements, software elements, or a combination of both. Examples of hardware elements may include devices, logic devices, components, processors, microprocessors, circuitry (e.g., circuitry 420 or 720), processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 1030 may further include other platform components 1050. Other platform components 1050 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 1030 may further include a network interface 1060. In some examples, network interface 1060 may include logic and/or features to support wireless network interfaces as described in one or more 3GPP LTE or LTE-A specifications or standards. For these examples, network interface 1060 may enable an apparatus 400 or 700 located at network equipment such as an EM, NM or VIM.

Device 1000 may be, for example, a computer, a personal computer (PC), a desktop computer, a laptop computer, an ultrabook computer, a smartphone, a tablet computer, a notebook computer, a netbook computer, a work station, a mini-computer, multiprocessor system, processor-based system, wireless access point, or combination thereof. Accordingly, functions and/or specific configurations of device 1000 described herein, may be included or omitted in various embodiments of device 1000, as suitably desired. In some embodiments, device 1000 may be configured to be compatible with protocols and frequencies associated one or more of the 3GPP LTE Specifications and/or IEEE 802.16 Standards for WMANs, and/or other broadband wireless networks, cited herein, although the examples are not limited in this respect.

Embodiments of device 1000 may be implemented using single input single output (SISO) architectures. However, certain implementations may include multiple antennas (e.g., antennas 1018-*j*) for transmission and/or reception using adaptive antenna techniques for beamforming or spatial division multiple access (SDMA) and/or using multiple input multiple output (MIMO) communication techniques.

The components and features of device 1000 may be implemented using any combination of discrete circuitry, application specific integrated circuits (ASICs), logic gates and/or single chip architectures. Further, the features of device 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in examples.

Figure 11:
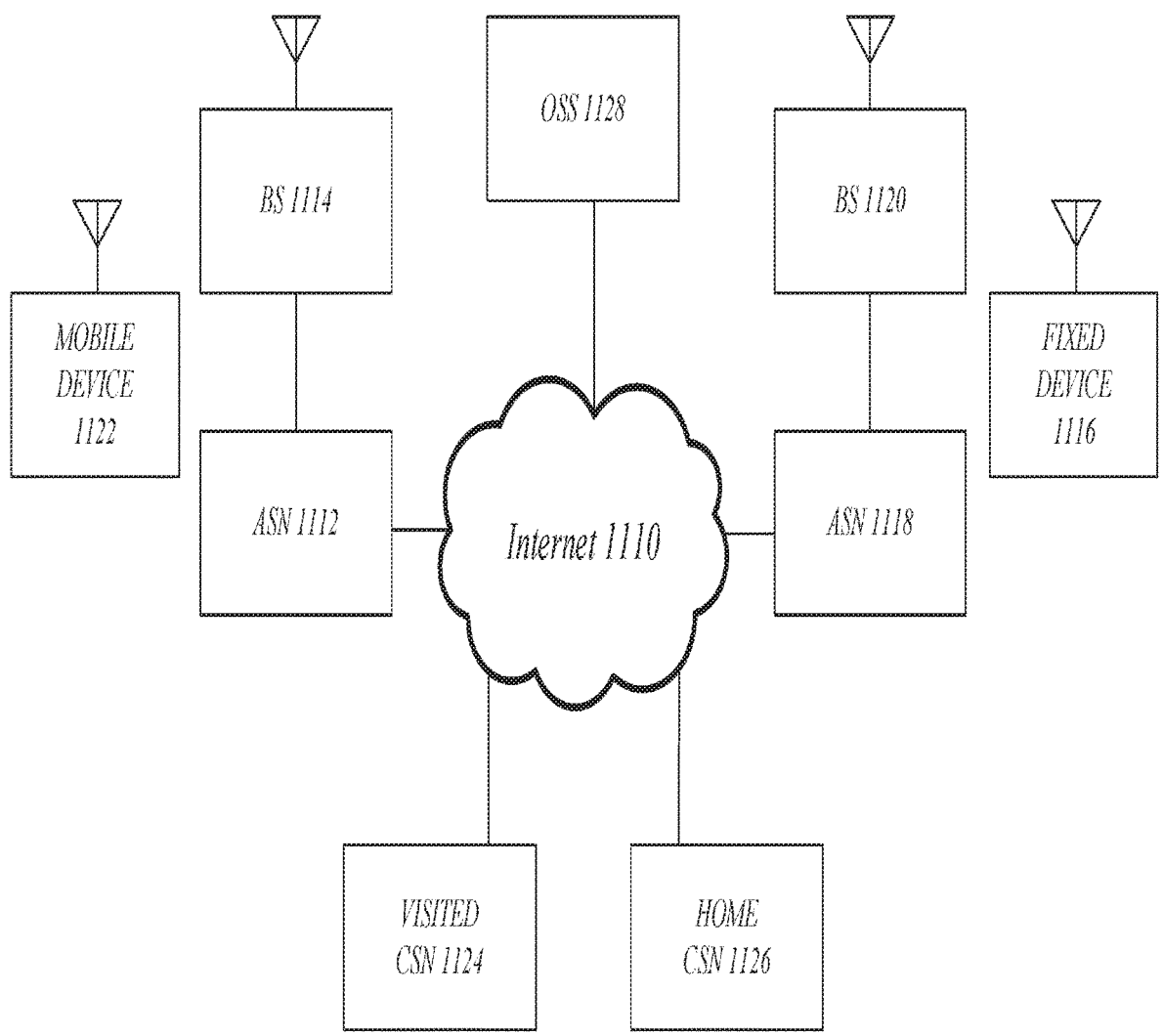
FIG. 11 illustrates an example of a broadband wireless access system.

FIG. 11 illustrates an embodiment of a broadband wireless access system 1100. As shown in FIG. 11, broadband wireless access system 1100 may be an internet protocol (IP) type network comprising an internet 1110 type network or the like that is capable of supporting mobile wireless access and/or fixed wireless access to internet 1110. In one or more embodiments, broadband wireless access system 1100 may comprise any type of orthogonal frequency division multiple access (OFDMA) and/or multiple single carrier frequency division multiple access (multiple SC-FDMA) based wireless network, such as a system compliant with one or more of the 3GPP LTE Specifications and/or IEEE 802.16 Standards, and the scope of this disclosure is not limited in these respects.

In the exemplary broadband wireless access system 1100, access service networks (ASN) 1114, 1118 are capable of coupling with base stations (BS) 1114, 1120 (RRHs or eNBs), respectively, to provide wireless communication between one or more fixed devices 1116 and internet 1110, or one or more mobile devices 1115 and Internet 1110. ASN 1112 may implement profiles that are capable of defining the mapping of network functions to one or more physical entities on broadband wireless access system 1100. Base stations 1114, 1120 (or eNBs) may comprise radio equipment to provide RF communication with fixed device 1116 and mobile device 1122, such as described with reference to device 1000 of FIG. 10, and may comprise, for example, the PHY, MAC, RLC or PDCP layer equipment in compliance with a 3GPP LTE Specification or an IEEE 802.16 Standard. Base stations 1114, 1120 (or eNBs) may further comprise an IP backplane to couple to Internet 1110 via ASN 1112, 1118, respectively, although the scope of the claimed subject matter is not limited in these respects.

Broadband wireless access system 1100 may further comprise a visited connectivity service network (CSN) 1124 capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CSN 1124 or home CSN 1126, and the scope of the claimed subject matter is not limited in these respects. Visited CSN 1124 may be referred to as a visited CSN in the case where visited CSN 1124 is not part of the regular service provider of fixed device 1116 or mobile device 1122, for example where fixed 1116 or mobile device 1122 is roaming away from their respective home CSN 1126, or where broadband wireless access system 1100 is part of the regular service provider of fixed device 1116 or mobile device 1122 but where broadband wireless access system 1100 may be in another location or state that is not the main or home location of fixed device 1116 or mobile device 1122.

Fixed device 1116 may be located anywhere within range of one or both base stations 1114, 1120, such as in or near a home or business to provide home or business customer broadband access to Internet 1110 via base stations 1114, 1120 and ASN 1112, 1118, respectively, and home CSN 1126. It is worthy to note that although fixed device 1116 is generally disposed in a stationary location, it may be moved to different locations as needed. Mobile device 1122 may be utilized at one or more locations if mobile device 1122 is within range of one or both base stations 1114, 1120, for example.

In accordance with one or more embodiments, operation support system (OSS) 1128 may be part of broadband wireless access system 1100 to provide management functions for broadband wireless access system 1100 and to provide interfaces between functional entities of broadband wireless access system 1100. Broadband wireless access system 1100 of FIG. 11 is merely one type of wireless network showing a certain number of the components of broadband wireless access system 1100, and the scope of the claimed subject matter is not limited in these respects.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The follow examples pertain to additional examples of technologies disclosed herein.

Example 1. An example apparatus may include logic, at least a portion of the logic in hardware, the logic to may receive first PM data for a VNF. The logic may also receive second PM data for NFVI arranged to support the VNF. The logic may also determine whether to initiate an NS LCM operation with an NFVO or VNF LCM operation with a VNFM based on implementation of a PM data correlation and detection of threshold crossing function using the first and/or the second PM data.

Example 2. The apparatus of example 1, the logic may be arranged as an EM for a 3GPP wireless network, the EM to receive the first PM data directly from the VNF. The logic may also receive the second PM data from VNFM coupled with a VIM that received the second PM data directly from the NFVI. The logic may also determine to initiate the VNF LCM operation with the VNFM based on implementation of the PM data correlation and detection of threshold crossing function using the first and/or the second PM data.

Example 3. The apparatus of example 2, the VNF LCM operation may include one or more of instantiate VNF instance, terminate VNF instance, query VNF instance, scale VNF instance or update VNF instance.

Example 4. The apparatus of example 2, the EM may forward the first PM data to an NM for the 3GPP wireless network. For these examples, the NM may initiate the NS LCM operation with the NFVO based on implementation of the PM data correlation and detection of threshold crossing function using the first and/or the second PM data.

Example 5. The apparatus of example 2, the first PM data may be related to VNF application layer performance to include calls-per-second, number-of-subscribers, mean number of dedicated EPS bearers in active mode or peak number of dedicated EPS bearers in active mode.

Example 6. The apparatus of example 2, the second PM data may be related to one or more virtualized resources composed from the NFVI and consumed while supporting the VNF, the second PM data including vCPU power consumption, VM memory usage oversubscription, VM disk latency, mean vCPU usage or peak vCPU usage.

Example 7. The apparatus of example 1, the second PM data may be related to one or more virtualized resources composed from the NFVI and is associated with the VNF consuming the virtualized resources while supporting the VNF and also related to a network service provided by the VNF.

Example 8. The apparatus of example 7, the logic may be arranged as an NM for a 3GPP wireless network. For these examples, the NM may receive the first and second PM data from an EM for the 3GPP wireless network and determine to initiate the NS LCM operation with the NFVO based on implementation of the PM data correlation and detection of threshold crossing function using the first and/or the second PM data Example 9. The apparatus of example 8, the NS LCM operation may include one or more of instantiate network service, terminate network service, query network service, scale network service, update network service, create VNFFG, delete VNFFG, query VNFFG, update VNFFG, create VL, delete VL, update VL or query VL.

Example 10. The apparatus of example 1, the PM data correlation and detection threshold crossing function using the first and/or the second PM data may include use of a plurality of PMs from among the first and/or the second PM data to detect whether a given threshold has been crossed.

Example 11. The apparatus of example 1 may also include a digital display coupled to the logic to present a user interface view.

Example 12. An example method may include receiving first PM data for a VNF. The method may also include receiving second PM data for NFVI arranged to support the VNF. The method may also include determining whether to initiate an NS LCM operation with an NFVO or a VNF LCM operation with a VNFM based on performing a PM data correlation and detection of threshold crossing function using the first and/or the second PM data.

Example 13. The method of example 12 may be implemented by an EM for a 3GPP wireless network. The method may also include receiving the first PM data directly from the VNF. The method may also include receiving the second PM data from the VNFM coupled with a VIM that received the second PM data directly from the NFVI. The method may also include determining to initiate the VNF LCM operation with the VNFM based on performing the PM data correlation and detection of threshold crossing function using the first and/or the second PM data.

Example 14. The method of example 13, the VNF LCM operation may include one or more of instantiate VNF instance, terminate VNF instance, query VNF instance, scale VNF instance or update VNF instance.

Example 15. The method of example 13 may also include forwarding the first PM data to an NM for the 3GPP wireless network. For these examples, the NM may initiate the NS LCM operation with the NFVO based on performing of the PM data correlation and detection of threshold crossing function using the first and/or the second PM data.

Example 16. The method of example 13, the first PM data may be related to VNF application layer performance to include calls-per-second, number-of-subscribers, mean number of dedicated EPS bearers in active mode or peak number of dedicated EPS bearers in active mode.

Example 17. The method of example 13, the second PM data may be related to one or more virtualized resources composed from the NFVI and consumed while supporting the VNF, the second PM data including vCPU power consumption, VM memory usage oversubscription, VM disk latency, mean vCPU usage or peak vCPU usage.

Example 18. The method of example 12, the second PM data may be related to one or more virtualized resources composed from the NFVI and is associated with the VNF consuming the virtualized resources while supporting the VNF and also related to a network service provided by the VNF.

Example 19. The method of example 12 may be implemented by an NM for a 3GPP wireless network. The method may also include receiving the first and second PM data from an EM for the 3GPP wireless network. The method may also include determining to initiate the NS LCM operation with the NFVO based on performing the PM data correlation and detection of threshold crossing function using the first and/or the second PM data.

Example 20. The method of example 19, the NS LCM operation may include one or more of instantiate network service, terminate network service, query network service, scale network service, update network service, create VNFFG, delete VNFFG, query VNFFG, update VNFFG, create VL, delete VL, update VL or query VL.

Example 21. The method of example 12, the PM data correlation and detection threshold crossing function using the first and/or the second PM data may include using a plurality of PMs from among the first and/or the second PM data to detect whether a given threshold has been crossed.

Example 22. An example at least one machine readable medium may include a plurality of instructions that in response to being executed by system may cause the system to carry out a method according to any one of examples 12 to 21.

Example 23. An example apparatus may include means for performing the methods of any one of examples 12 to 21.

Example 24. An example at least one non-transitory machine readable medium may include a plurality of instructions that in response to being executed on a system for a 3GPP wireless network may cause the system to receive first PM data for a VNF. The instructions may also cause the system to receive second PM data for NFVI arranged to support the VNF and determine whether to request an NS LCM operation with an NFVO or a VNF LCM operation with a VNFM based on performance of a PM data correlation and detection of threshold crossing function using the first and/or the second PM data.

Example 25. The at least one non-transitory machine readable medium of example 24, the system comprising an EM for a 3GPP wireless network, the instructions may further cause the EM to receive the first PM data directly from the VNF. The instructions may also cause the EM to receive the second PM data from a VNFM coupled with a VIM that received the second PM data directly from the NFVI. The instructions may also cause the EM to determine to initiate the VNF LCM operation with the VNFM based on implementation of the PM data correlation and detection of threshold crossing function using the first and/or the second PM data.

Example 26. The at least one non-transitory machine readable medium of example 25, the VNF LCM operation may include one or more of instantiate VNF instance, terminate VNF instance, query VNF instance, scale VNF instance or update VNF instance.

Example 27. The at least one non-transitory machine readable medium of example 25, the instructions to further cause the EM to forward the first PM data to an NM for the 3GPP wireless network. For these examples, the NM may initiate the NS LCM operation with the NFVO based on performance of the PM data correlation and detection of threshold crossing function using the first and/or the second PM data.

Example 28. The at least one non-transitory machine readable medium of example 25, the first PM data related to VNF application layer performance may include calls-per-second, number-of-subscribers, mean number of dedicated EPS bearers in active mode or peak number of dedicated EPS bearers in active mode.

Example 29. The at least one non-transitory machine readable medium of example 25, the second PM data may be related to one or more virtualized resources composed from the NFVI and consumed while supporting the VNF. Also, the second PM data may include vCPU power consumption, VM memory usage oversubscription, VM disk latency, mean vCPU usage or peak vCPU usage.

Example 30. The at least one non-transitory machine readable medium of example 24, the second PM data may be related to one or more virtualized resources composed from the NFVI and may be associated with the VNF consuming the virtualized resources while supporting the VNF and may also be related to a network service provided by the VNF.

Example 31. The at least one non-transitory machine readable medium of example 24, the system may include an NM for a 3GPP wireless network, the instructions to further cause the NM to receive the first and second PM data from an EM for the 3GPP wireless network. The instructions may also cause the NM to determine to initiate the NS LCM operation with the NFVO based on performance of the PM data correlation and detection of threshold crossing function using the first and/or the second PM data.

Example 32. The at least one non-transitory machine readable medium of example 31, the NS LCM operation may include one or more of instantiate network service, terminate network service, query network service, scale network service, update network service, create VNFFG, delete VNFFG, query VNFFG, update VNFFG, create VL, delete VL, update VL or query VL.

Example 33. The at least one non-transitory machine readable medium of example 24, the PM data correlation and detection threshold crossing function using the first and/or the second PM data may include use of a plurality of PMs from among the first and/or the second PM data to detect whether a given threshold has been crossed.

Example 34. An example apparatus may include logic, at least a portion of the logic in hardware, the logic may be arranged to operate as a VIM for NFVI. The VIM may receive PM data generated by the NFVI while the NFVI supports one or more virtualized network functions (VNFs). The VIM may also forward the PM data to an NFVO if the PM data is related to a network service provided by the one or more VNFs. The VIM may also forward the PM data to a VNFM arranged to manage the one or more VNFs if the PM data is related to one or more virtualized resources composed from the NFVI and consumed while the virtualized resources support the one or more VNFs.

Example 35. The apparatus of example 34, the PM data related to the network service provided by the one or more VNFs may be forwarded from the NFVO to an NM for a 3GPP wireless network. For this example, the NM may implement a PM data correlation and detection of threshold crossing function using the PM data related to the network service to determine whether to initiate an NS LCM operation with the NFVO.

Example 36. The apparatus of example 35, the NS LCM operation may include one or more of instantiate network service, terminate network service, query network service, scale network service, update network service, create VNFFG, delete VNFFG, query VNFFG, update VNFFG, create VL, delete VL, update VL or query VL.

Example 37. The apparatus of example 34, the PM data related to the network service provided by the one or more VNFs may be forwarded from the VNFM to an EM for a 3GPP wireless network. For this example, the EM may implement a PM data correlation and detection of threshold crossing function using the PM data related to the one or more virtualized resources to determine whether to initiate a VNF LCM operation with the VNFM.

Example 38. The apparatus of example 37, the VNF LCM operation may include one or more of instantiate VNF instance, terminate VNF instance, query VNF instance, scale VNF instance or update VNF instance.

Example 39. The apparatus of example 34, the PM data related to the network service may include latency of one or more virtual links supporting the one or more VNFs, usage of the one or more virtual links supporting the one or more VNFs, average bandwidth used by the one or more VNFs to provide the network service over a time interval, peak bandwidth used by the one or more VNFs to provide the network service over the time interval, number of VMs utilized by the one or more VNFs to provide the network service or number of vCPUs utilized by the one or more VNFs to provide the network service.

Example 40. The apparatus of example 34, the PM data related to the one or more virtualized resources may include vCPU power consumption, VM memory usage oversubscription, VM disk latency, mean vCPU usage or peak vCPU usage.

Example 41. The apparatus of example 34 may also include a digital display to present a user interface view.

Example 42. An example method may include receiving, at a VIM for managing NFVI, PM data generated by the NFVI while the NFVI supports one or more VNFs. The method may also include forwarding the PM data to an NFVO if the PM data is related to a network service provided by the one or more VNFs. The method may also include forwarding the PM data to a VNFM arranged to manage the one or more VNFs if the PM data is related to one or more virtualized resources composed from the NFVI and consumed while the virtualized resources support the one or more VNFs.

Example 43. The method of example 42, the PM data related to the network service provided by the one or more VNFs may be forwarded from the NFVO to an NM for a 3GPP wireless network. For this example, the NM may implement a PM data correlation and detection of threshold crossing function using the PM data related to the network service to determine whether to initiate an NS LCM operation with the NFVO.

Example 44. The method of example 43, the NS LCM operation may include one or more of instantiate network service, terminate network service, query network service, scale network service, update network service, create VNFFG, delete VNFFG, query VNFFG, update VNFFG, create VL, delete VL, update VL or query VL.

Example 45. The method of example 42, the PM data related to the network service provided by the one or more VNFs may be forwarded from the VNFM to an EM for a 3GPP wireless network, the EM to implement a PM data correlation and detection of threshold crossing function using the PM data related to the one or more virtualized resources to determine whether to initiate a VNF LCM operation with the VNFM.

Example 46. The method of example 45, the VNF LCM operation may include one or more of instantiate VNF instance, terminate VNF instance, query VNF instance, scale VNF instance or update VNF instance.

Example 47. The method of example 42, the PM data related to the network service may include latency of one or more virtual links supporting the one or more VNFs, usage of the one or more virtual links supporting the one or more VNFs, average bandwidth used by the one or more VNFs to provide the network service over a time interval, peak bandwidth used by the one or more VNFs to provide the network service over the time interval, number of VMs utilized by the one or more VNFs to provide the network service or number of vCPUs utilized by the one or more VNFs to provide the network service.

Example 48. The method of example 42, the PM data related to the one or more virtualized resources may include vCPU power consumption, VM memory usage oversubscription, VM disk latency, mean vCPU usage or peak vCPU usage.

Example 49. An example at least one non-transitory machine readable medium may include a plurality of instructions that in response to being executed on a system cause the system to carry out a method according to any one of examples 42 to 48.

Example 50. An example apparatus may include means for performing the methods of any one of examples 42 to 48.

Example 51. At least one non-transitory machine readable medium may include a plurality of instructions that in response to being executed on a system arranged to operate as a VIM for NFVI, causes the system to receive PM data generated by the NFVI while the NFVI supports one or more VNFs. The instructions may also cause the system to forward the PM data to an NFVO if the PM data is related to a network service provided by the one or more VNFs. The instructions may also cause the system to forward the PM data to a VNFM arranged to manage the one or more VNFs if the PM data is related to one or more virtualized resources composed from the NFVI and consumed while the virtualized resources support the one or more VNFs.

Example 52. The at least one non-transitory machine readable medium of example 51, the PM data related to the network service provided by the one or more VNFs may be forwarded from the NFVO to an NM for a 3GPP wireless network. For this example, the NM may implement a PM data correlation and detection of threshold crossing function using the PM data related to the network service to determine whether to initiate an NS LCM operation with the NFVO.

Example 53. The at least one non-transitory machine readable medium of example 52, the NS LCM operation may include one or more of instantiate network service, terminate network service, query network service, scale network service, update network service, create VNFFG, delete VNFFG, query VNFFG, update VNFFG, create VL, delete VL, update VL or query VL.

Example 54. The at least one non-transitory machine readable medium of example 51, the PM data related to the network service provided by the one or more VNFs may be forwarded from the VNFM to an EM for a 3GPP wireless network. For this example, the EM may implement a PM data correlation and detection of threshold crossing function using the PM data related to the one or more virtualized resources to determine whether to initiate a VNF LCM operation with the VNFM.

Example 55. The at least one non-transitory machine readable medium of example 54, the VNF LCM operation may include one or more of instantiate VNF instance, terminate VNF instance, query VNF instance, scale VNF instance or update VNF instance.

Example 56. The at least one non-transitory machine readable medium of example 51, the PM data related to the network service may include latency of one or more virtual links supporting the one or more VNFs, usage of the one or more virtual links supporting the one or more VNFs, average bandwidth used by the one or more VNFs to provide the network service over a time interval, peak bandwidth used by the one or more VNFs to provide the network service over the time interval, number of VMs utilized by the one or more VNFs to provide the network service or number of vCPUs utilized by the one or more VNFs to provide the network service.

Example 57. The at least one non-transitory machine readable medium of example 51, the PM data related to the one or more virtualized resources may include vCPU power consumption, VM memory usage oversubscription, VM disk latency, mean vCPU usage or peak vCPU usage.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the examples. In addition, in the foregoing Detailed Description, it can be seen that various features are grouped together in a single example for the purpose of streamlining the disclosure.

This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "may include" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented by a network manager (NM) for a Third Generation Partnership Project (3GPP) wireless network, the method comprising:
   receiving first performance measurement (PM) data related to a virtualized network function (VNF) from an element manager (EM) of the 3GPP wireless network, wherein the first PM data is used by a threshold crossing function performed at the NM; and
   determining whether to initiate a network services (NS) lifecycle management (LCM) operation with a network functions virtualization orchestrator (NFVO) based on one or more of:
   a detection of a threshold crossing by the threshold crossing function using the first PM data; and
   the first PM data.

2. The method of claim 1, further comprising:
   receiving, from the EM, second PM data related to network functions virtualization infrastructure (NFVI) arranged to support the VNF.

3. The method of claim 2, wherein determining whether to initiate the NS LCM operation with the NFVO is further based on performing a PM data correlation using the first PM data and/or the second PM data.

4. The method of claim 2, wherein the first PM data includes calls-per-second, number-of-subscribers, mean number of dedicated evolved packet system (EPS) bearers in active mode or peak number of dedicated EPS bearers in active mode.

5. The method of claim 2, wherein the second PM data includes virtual central processing unit (vCPU) power consumption, virtual machine (VM) memory usage oversubscription, VM disk latency, mean vCPU usage or peak vCPU usage.

6. The method of claim 1, wherein the NS LCM operation comprises an operation to scale network service.

7. The method of claim 1, wherein the threshold crossing function uses a plurality of PMs from among the first PM data to detect whether a given threshold has been crossed.

8. A network manager (NM) for a Third Generation Partnership Project (3GPP) wireless network, the NM comprising:

a processor to:
 receive first performance measurement (PM) data related to a virtualized network function (VNF) from an element manager (EM) of the 3GPP wireless network, wherein the first PM data is used by a threshold crossing function performed at the NM; and
 determine whether to initiate a network services (NS) lifecycle management (LCM) operation with a network functions virtualization orchestrator (NFVO) based on one or more of: a detection of a threshold crossing by the threshold crossing function using the first PM data, and the first PM data.

9. The NM of claim 8, wherein the processor is further to:
receive, from the EM, second PM data related to network functions virtualization infrastructure (NFVI) arranged to support the VNF.

10. The NM of claim 9, wherein determining whether to initiate the NS LCM operation with the NFVO is further based on a PM data correlation using the first PM data and the second PM data.

11. The NM of claim 10, wherein the first PM data includes calls-per-second, number-of-subscribers, mean number of dedicated evolved packet system (EPS) bearers in active mode or peak number of dedicated EPS bearers in active mode.

12. The NM of claim 11, wherein the second PM data includes virtual central processing unit (vCPU) power consumption, virtual machine (VM) memory usage oversubscription, VM disk latency, mean vCPU usage or peak vCPU usage.

13. The NM of claim 8, wherein the NS LCM operation comprises an operation to scale network service.

14. The NM of claim 8, wherein the threshold crossing function uses a plurality of PMs from among the first PM data to detect whether a given threshold has been crossed.

15. One or more processors to execute logic, the logic comprising:

a virtualized network function (VNF) performance measurement (PM) data module to receive VNF PM data related to a VNF from an element manager (EM) of a 3GPP wireless network, wherein the VNF PM data is used by a threshold crossing function performed at a network manager (NM) of the 3GPP wireless network; and
 a function module to determine whether to initiate a network services (NS) lifecycle management (LCM) operation with a network functions virtualization orchestrator (NFVO) based on one or more of:
  a detection of a threshold crossing by the threshold crossing function using the VNF PM data; and
  the VNF PM data.

16. The one or more processors of claim 15, wherein the VNF PM data includes calls-per-second, number-of-subscribers, mean number of dedicated evolved packet system (EPS) bearers in active mode or peak number of dedicated EPS bearers in active mode.

17. The one or more processors of claim 16, wherein the logic further comprises:
 a network functions virtualization infrastructure (NFVI) PM data module to receive, from the EM, NFVI PM data related to a NFVI arranged to support the VNF.

18. The one or more processors of claim 17, wherein the NFVI PM data includes virtual central processing unit (vCPU) power consumption, virtual machine (VM) memory usage oversubscription, VM disk latency, mean vCPU usage or peak vCPU usage.

19. The one or more processors of claim 18, wherein determining whether to initiate the NS LCM operation with the NFVO is further based on a PM data correlation using the VNF PM data and the NFVI PM data.

20. The one or more processors of claim 15, wherein the NS LCM operation comprises an operation to scale network service.

* * * * *